(12) United States Patent
Hisashima et al.

(10) Patent No.: US 11,927,923 B2
(45) Date of Patent: Mar. 12, 2024

(54) TIME SYNCHRONIZATION SYSTEM, MANAGEMENT DEVICE, TIME SYNCHRONIZATION METHOD, AND PROGRAM

(71) Applicant: Nippon Telegraph and Telephone Corporation, Tokyo (JP)

(72) Inventors: Takaaki Hisashima, Tokyo (JP); Hiroki Sakuma, Tokyo (JP); Kaoru Arai, Tokyo (JP); Ryuta Sugiyama, Tokyo (JP); Shunichi Tsuboi, Tokyo (JP); Osamu Kurokawa, Tokyo (JP); Kazuyuki Matsumura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 829 days.

(21) Appl. No.: 16/977,988

(22) PCT Filed: Mar. 5, 2019

(86) PCT No.: PCT/JP2019/008711
§ 371 (c)(1),
(2) Date: Sep. 3, 2020

(87) PCT Pub. No.: WO2019/176660
PCT Pub. Date: Sep. 19, 2019

(65) Prior Publication Data
US 2021/0072707 A1  Mar. 11, 2021

(30) Foreign Application Priority Data

Mar. 13, 2018 (JP) ................................ 2018-045224

(51) Int. Cl.
*G04R 20/02* (2013.01)
*G01S 19/21* (2010.01)
(Continued)

(52) U.S. Cl.
CPC .............. *G04R 20/02* (2013.01); *G01S 19/21* (2013.01); *G01S 19/256* (2013.01); *G04G 5/002* (2013.01); *G04G 7/023* (2013.01)

(58) Field of Classification Search
CPC ....... G04R 20/02; G01S 19/21; G01S 19/256; G04G 5/002; G04G 7/023; G04G 7/02; H04L 7/00
(Continued)

(56) References Cited

U.S. PATENT DOCUMENTS 5,563,917 A * 10/1996 Sheynblat ............... G01S 19/07
455/12.1
5,796,773 A *  8/1998 Sheynblat ............... G01S 19/22
342/357.44
(Continued)

OTHER PUBLICATIONS

Jaxa.jp, [online], "Know Where One is on Earth from Distant Space," 2003, retrieved on Jan. 26, 2018, retrieved from URL<https://www.jaxa.jp/countdown/f18/overview/gps_j.html>, 5 pages (with English Translation).
(Continued)

*Primary Examiner* — Jaime Figueroa
(74) *Attorney, Agent, or Firm* — Fish & Richardson P.C.

(57) ABSTRACT

A management apparatus in a time synchronization system includes a time variation information receiving unit configured to acquire time variation information and position information of a time synchronization apparatus, a position information classifying unit configured to classify time synchronization apparatuses into predetermined categories based on the acquired position information, a time variation analysis configured to determine majority based on whether patterns of time variation of the time synchronization apparatuses belonging to an identical category are identical to each other, and to analyze the time variation based on the determined results, and a filtering and delivery unit config-
(Continued)

ured to output an instruction to block the time information received from the positioning satellite, to the time synchronization apparatus having abnormal time variation. A GPS-FW includes a filtering determination unit configured to blocks the time information received from a GPS satellite in a case where a block instruction is received from the management apparatus.

6 Claims, 12 Drawing Sheets

(51) Int. Cl.
    *G01S 19/25*     (2010.01)
    *G04G 5/00*     (2013.01)
    *G04G 7/00*     (2006.01)

(58) Field of Classification Search
    USPC .................................................. 701/1, 418
    See application file for complete search history.

(56) References Cited

U.S. PATENT DOCUMENTS

| | | | | |
|---|---|---|---|---|
| 6,151,375 A * | 11/2000 | Nakatsugawa | .... | H04N 21/4355 348/E5.009 |
| 6,590,524 B1 * | 7/2003 | Farley | ..... | G01S 19/11 342/357.56 |
| 6,999,027 B1 * | 2/2006 | Stockmaster | ..... | H04K 3/228 342/357.29 |
| 7,215,652 B1 * | 5/2007 | Foley | ..... | H04B 7/212 370/324 |
| 7,359,344 B1 * | 4/2008 | Cheng | ..... | H04B 7/18589 370/321 |
| 7,394,780 B1 * | 7/2008 | Gregory | ..... | H04L 1/0009 370/316 |
| 7,579,984 B2 * | 8/2009 | Wang | ..... | G01C 21/165 342/357.65 |
| 7,876,266 B2 * | 1/2011 | Rhoads | ..... | G01S 5/26 342/463 |
| 8,134,499 B2 * | 3/2012 | Wang | ..... | G01S 19/21 701/472 |
| 8,560,234 B2 * | 10/2013 | Kahn | ..... | G01S 19/49 701/470 |
| 8,896,479 B2 * | 11/2014 | Wang | ..... | G01S 19/21 342/16 |
| 9,791,545 B2 * | 10/2017 | Rhoads | ..... | G01S 5/26 |
| 10,591,581 B2 * | 3/2020 | Rhoads | ..... | G01S 5/18 |
| 10,736,062 B2 * | 8/2020 | Malekpour | ..... | G01S 5/14 |
| 11,218,984 B1 * | 1/2022 | Lutz | ..... | H04W 88/085 |
| 2002/0042675 A1 * | 4/2002 | Takahashi | ..... | G01S 19/25 701/468 |
| 2005/0001742 A1 * | 1/2005 | Small | ..... | G01S 19/23 342/357.62 |
| 2005/0058149 A1 * | 3/2005 | Howe | ..... | H04L 49/602 370/428 |
| 2007/0118286 A1 * | 5/2007 | Wang | ..... | G01S 19/47 342/357.65 |
| 2007/0194987 A1 * | 8/2007 | Fedora | ..... | G01S 5/14 342/386 |
| 2008/0129591 A1 * | 6/2008 | Lamance | ..... | G01S 19/05 342/357.42 |
| 2009/0262014 A1 * | 10/2009 | DiEsposti | ..... | G01S 19/05 342/357.42 |
| 2009/0313370 A1 * | 12/2009 | Rhoads | ..... | G01S 5/18 709/224 |
| 2010/0045531 A1 * | 2/2010 | Rhoads | ..... | G01S 5/26 342/463 |
| 2011/0169689 A1 * | 7/2011 | Wang | ..... | G01C 21/165 342/357.3 |
| 2014/0247185 A1 * | 9/2014 | Achanta | ..... | G01S 19/20 342/357.58 |
| 2015/0071308 A1 * | 3/2015 | Webb, III | ..... | H04W 56/0035 370/503 |
| 2015/0215031 A1 * | 7/2015 | Dalvi | ..... | H04B 7/18578 370/324 |
| 2016/0306048 A1 * | 10/2016 | Dunn | ..... | G04G 7/00 |
| 2017/0150464 A1 * | 5/2017 | Kazehaya | ..... | H04J 3/0641 |
| 2018/0210066 A1 * | 7/2018 | Rhoads | ..... | G01S 5/18 |
| 2018/0288718 A1 * | 10/2018 | Bal | ..... | H04L 7/04 |
| 2018/0332548 A1 * | 11/2018 | Malekpour | ..... | H04W 56/001 |
| 2020/0241146 A1 * | 7/2020 | Kim | ..... | G01S 19/39 |
| 2021/0286087 A1 * | 9/2021 | Yoshida | ..... | G01S 19/28 |
| 2023/0315025 A1 * | 10/2023 | Castle | ..... | G01S 19/256 368/47 |

OTHER PUBLICATIONS

Microsemi.com, [online], "BlueSky GPS Firewall," 2018, retrieved on Jan. 26, 2018, retrieved from URL<http://web116.jp/shop/annai/gisanshi/analog/pdf/analog_gisanshi.pdf>, 2 pages.

Orange, Nokia, Microsemi Corp., "Telecommunication Standardization Sector," International Telecommunication Union, Jan. 29-Feb. 9, 2018, 3 pages.

* cited by examiner

TIME SYNCHRONIZATION SYSTEM, MANAGEMENT DEVICE, TIME SYNCHRONIZATION METHOD, AND PROGRAM

CROSS-REFERENCE TO RELATED APPLICATIONS

This application is a National Stage application under 35 U.S.C. § 371 of International Application No. PCT/JP2019/008711, having an International Filing Date of Mar. 5, 2019, which claims priority to Japanese Application Serial No. 2018-045224, filed on Mar. 13, 2018. The disclosure of the prior application is considered part of the disclosure of this application, and is incorporated in its entirety into this application

TECHNICAL FIELD

The present disclosure relates to a time synchronization system, a management apparatus, a time synchronization method, and a program.

BACKGROUND ART

In order to realize a system that needs time synchronization accuracy on the order of microseconds or sub-microseconds, time delivery of equivalent or less accuracy error is required for Coordinated Universal Time (UTC). In a common high accuracy time delivery system, an accurate time is generated using a Global Navigation Satellite System (GNSS) or a Precision Timing Protocol (PTP, IEEE1588). The PTP is a protocol for delivering an accurate time from a Grandmaster Clock (GMC) server to a client in a wired network. Thus, time synchronization accuracy of about 1 microsecond is obtained for the GMC.

In recent years, highly-accurate time synchronization is required as measures for increasing the speed of mobile services. A method of receiving reference time synchronization from a Global Positioning System (GPS) satellite is commonly known as a method of performing highly-accurate time synchronization.

In a case where positioning is performed, a GPS receiver needs to capture signals from four GPS satellites (positioning satellites) in minimum. If capturing a signal from one GPS satellite in minimum is possible on the premise that the exact location (latitude/longitude/altitude) of the GPS receiver is known, it is possible to obtain a UTC synchronization time. A signal from the GPS satellite is weak, and a signal (C/A code) for civilian use is transmitted in an non-encrypted state. Thus, the signal is easily affected by electromagnetic noise and interference radio waves. However, there is a large advantage that a high accuracy time is obtained so long as a cheap GPS receiver is provided (see Non-Patent Literature 1).

There are many systems that require highly-accurate time synchronization in a network. For example, in a financial highly frequent transaction, it is necessary to match the reference time of a server for recording transaction data using a timestamp or for measuring a delay between the stock exchanged and stock brokerage houses. In a base station of a mobile system, a transmission and reception timing can be synchronized between base stations, and multiple carriers may be bundled to implement wideband. In a power system, the shift of a frequency or a phase can be detected in a manner that measuring instruments having a synchronized time at a plurality of places on a power line acquire voltage values at the same timing.

Because a signal (C/A code) for civilian use is transmitted in an non-encrypted state, a time synchronization method using a signal from a GPS satellite involves security risks as follows. That is, an attacker can generate a pseudo GPS signal and perform synchronization (jamming) with the generated signal to intentionally disturb time information.

FIGS. 7A and 7B are diagrams illustrating security risks of the time synchronization method using a signal from a GPS satellite.

As illustrated in FIG. 7A, a time synchronization apparatus 10 includes a Grandmaster Clock apparatus (referred to as a GM below) 11 that provides a reference time. The time synchronization apparatus 10 receives radio waves from a GPS satellite 1 via an antenna 10a, and inputs high accuracy time information to the GM 11. The GM 11 uses a high accuracy time of the GPS satellite 1 as a time source to normally synchronize with the high accuracy time of the GPS satellite 1. Since the GM 11 uses the GPS signal, the GM 11 obtains a high accuracy reference time and does not require regular time calibration. The GM 11 has a need to maintain the high accuracy reference time even in a state where the GPS signal is interrupted for some reasons (for example, antenna failure by interference waves or lightning strike) (time Holdover state).

As indicated by the reference sign a in FIG. 7B, an attack in which an attacker generates a pseudo GPS signal and perform synchronization (jamming) with the generated signal is considered. If the time synchronization apparatus 10 receives the jamming signal, the GM 11 may use the time of the jamming signal as the time source and synchronize with the wrong time.

A technology of providing a GPS-FW (Firewall) is known as a method of handling the disturbance of time information by the jamming signal illustrated in FIG. 7B (see Non-Patent Literature 2).

FIG. 8 is a diagram illustrating the time synchronization apparatus 10 in which a GPS-FW is provided for security measures.

As illustrated in FIG. 8, each of time synchronization apparatuses 10-1 and 10-2 includes a GPS-FW 12 for identifying a GPS signal at the front stage (input side) of the GM 11. A high-accuracy frequency source 20 that oscillates a high-accuracy frequency is provided outside the time synchronization apparatuses 10-1 and 10-2. A high-accuracy frequency from the high-accuracy frequency source 20 is input to the GM 11. The high-accuracy frequency source 20 is a 10 MHz frequency standard module in which phase noise is small, and, for example, an Oven Controlled Crystal Oscillator (OCXO) is used as a frequency reference source.

The GPS-FW 12 detects jamming indicated by the reference sign a in FIG. 8. In a case where the GPS-FW 12 detects jamming, the GPS-FW 12 blocks the time information of the jamming (see the reference sign b in FIG. 8). A signal identifying algorithm applied to the GPS-FW 12 is a threshold determination type that does not follow in a case where the amount of time variation in unit time is equal to or greater than threshold.

In response to blocking of the time information, the GM 11 transitions to the time Holdover state. The GM 11 takes time synchronization using the high-accuracy frequency of the high-accuracy frequency source 20 as a reference time source, and performs time delivery.

CITATION LIST

Non Patent Literature

Non-Patent Literature 1: "JAXA: What is positioning to know where and where you are now?" [online], [Search on Feb. 1, 2018], Internet (URL: http://www.jaxajp/countdown/f18/overview/GPS_j.html)
Non-Patent Literature 2: "BlueSky GPS Firewall: Microsemi", [online], [Search on Feb. 1, 2018], Internet (URL: http://web116.jp/shop/annai/gisanshi/analog/pdf/analog_gisanshi.pdf)
Non-Patent Literature 3: ITU-T SG15 contribution C651 Orange, Nokia, Microsemi. Geneva, January, 2018 "GNSS-TR, Error magnitude for major sources of GNSS time error"

SUMMARY OF THE INVENTION

Technical Problem

However, a GPS-FW in the related art is for filtering time variation by threshold and may not handle GPS jamming that, for example, continues within the threshold range for a long term. In a case where the threshold is set to be small, there is a risk of erroneously determining normal time variation as GPS jamming.

FIG. 9 is a diagram illustrating a detection algorithm of the GPS-FW in the related art. A horizontal axis indicates a time, and a vertical axis indicates the amount of time variation. A solid line indicates the amount of time variation, and a broken line indicates threshold.

If the amount of time variation in unit time is equal to or greater than the threshold, the GPS-FW determines the amount of time variation abnormal. The threshold varies due to a GPS factor or a weather factor, and there is a risk for erroneous detection if the threshold is reduced. Thus, it is necessary to set an appropriate threshold, and there is a problem in that it is not possible to detect the variation in threshold in the detection algorithm of the GPS-FW.

As illustrated in the broken line in FIG. 9, the time variation continues without returning to the original level, and the amount of time variation is maintained. Thus, in a case of time variation, the time synchronization apparatus 10 (see FIG. 8) has a need to correct the amount of time variation that has changed by level shift.

The present disclosure has been made in view of such background, and an object of the present disclosure is to provide a time synchronization system, a management apparatus, a time synchronization method, and a program, in which it is possible to filter jamming causing minute disturbances to continue.

Means for Solving the Problem

In order to solve the above-described problem, according to claim 5, a management apparatus of a time synchronization system including a plurality of time synchronization apparatuses, each of the plurality of time synchronization apparatuses being configured to receive a radio wave from a positioning satellite and to take time synchronization using time information included in the received radio wave as a time source to deliver a time. The management apparatus includes a time variation information acquisition unit configured to acquire time variation information and position information of each of the time synchronization apparatus, a category classification unit configured to classify the time synchronization apparatuses into predetermined categories based on the acquired position information, an analysis unit configured to determine majority based on whether patterns of time variation of the time synchronization apparatuses belonging to an identical category are identical to each other, and to analyze the time variation based on the determined results, and an output unit configured to output an instruction to block the time information received from the positioning satellite, to the time synchronization apparatus having abnormal time variation.

According to claim 6, a time synchronization method in a management apparatus of a time synchronization system including a plurality of time synchronization apparatuses, each of the plurality of time synchronization apparatuses configured to receive a radio wave from a positioning satellite and to take time synchronization using time information included in the received radio wave as a time source to deliver a time, the method includes acquiring time variation information and position information of each of the time synchronization apparatus, classifying the time synchronization apparatuses into predetermined categories based on the acquired position information, determining majority based on whether patterns of time variation of the time synchronization apparatuses belonging to an identical category are identical to each other, and analyzing the time variation based on the determined results, and outputting an instruction to block the time information received from the positioning satellite, to the time synchronization apparatus having abnormal time variation.

According to claim 7, a program causing a computer as a server apparatus including a plurality of time synchronization apparatuses, each of the plurality of time synchronization apparatuses configured to receive a radio wave from a positioning satellite and to take time synchronization using time information included in the received radio wave as a time source to deliver a time, to function as a time variation information acquisition unit configured to acquire time variation information and position information of each of the time synchronization apparatus, a category classification unit configured to classify the time synchronization apparatuses into predetermined categories based on the acquired position information, an analysis unit configured to determine majority based on whether patterns of time variation of the time synchronization apparatuses belonging to an identical category are identical to each other, and to analyze the time variation based on the determined results, and an output unit configured to output an instruction to block the time information received from the positioning satellite, to the time synchronization apparatus having abnormal time variation.

In this manner, it is possible to detect GPS jamming without using a filter for time variation by threshold, and thus to filter jamming causing minute disturbances to continue. Because the threshold is not used, it is possible to improve detection accuracy of jamming.

According to claim 1, a time synchronization system includes a plurality of time synchronization apparatuses, each of the plurality of time synchronization apparatuses configured to receive a radio wave from a positioning satellite and to take time synchronization using time information included in the received radio wave as a time source to deliver a time, and a management apparatus including a time variation information acquisition unit configured to acquire time variation information and position information of each of the time synchronization apparatus, a category classification unit configured to classify the time synchronization apparatuses into predetermined categories based on the acquired position information, an analysis unit configured to determine majority based on whether patterns of time variation of the time synchronization apparatuses belonging to an identical category are identical to each other, and to analyze the time variation based on the determined results, and an output unit configured to output an instruction to block the time information received from the positioning satellite, to the time synchronization apparatus having abnormal time variation. The time synchronization apparatus includes a filtering unit configured to, in a case of receiving a block instruction from the management apparatus, block the time information received from the positioning satellite.

In this manner, it is possible to detect GPS jamming without using a filter for time variation by threshold, and thus to filter jamming causing minute disturbances to continue. Because the threshold is not used, it is possible to improve detection accuracy of jamming. The time synchronization apparatus can block the time information in a GPS signal.

According to claim 2, in the time synchronization system in claim 1, the category classification unit categorizes such that environmental factors having similar time variation are categorized as identical to each other.

In this manner, the time variation of the same environment is uniform, and thus it is possible to eliminate an error caused by an environmental factor.

According to claim 3, in the time synchronization system in claim 1, the analysis unit determines that a majority side is normal time variation and determines that a minority side is abnormal time variation. The output unit transmits, in accordance with a determination that the majority side is normal time variation, following OK to the time synchronization apparatus on the majority side, and transmits, in accordance with a determination that the minority side is abnormal time variation, following NG to the time synchronization apparatus on the minority side.

In this manner, the time synchronization apparatuses on the minority side can block the time information in the GPS signal. The time synchronization apparatuses on the majority side can continuously perform highly-accurate time synchronization using a highly-accurate time of the GPS satellite as a time source.

According to claim 4, the time synchronization system in claim 1 further includes a high-accuracy frequency source. The time synchronization apparatus transitions, in response to blocking of the time information, to a state where the time is not synchronized with the time information included in the radio wave from the positioning satellite, and takes time synchronization using a high-accuracy frequency of the high-accuracy frequency source as a reference time source to perform time delivery.

In this manner, the time synchronization apparatus can filter GPS jamming without setting threshold. It is possible to transition to a time Holdover state in response to blocking of the time information.

Effects of the Invention

According to the present disclosure, it is possible to provide a time synchronization system, a management apparatus, a time synchronization method, and a program in which it is possible to filter jamming causing minute disturbances to continue.

DESCRIPTION OF EMBODIMENTS

Hereinafter, a time synchronization system and the like according to an embodiment for realizing the present disclosure (referred to as "a present embodiment" below) will be described with reference to the drawings.

The present embodiment is an example in which the present disclosure is applied to a GPS system using a GPS satellite as a positioning satellite.

Embodiment

Figure 1:
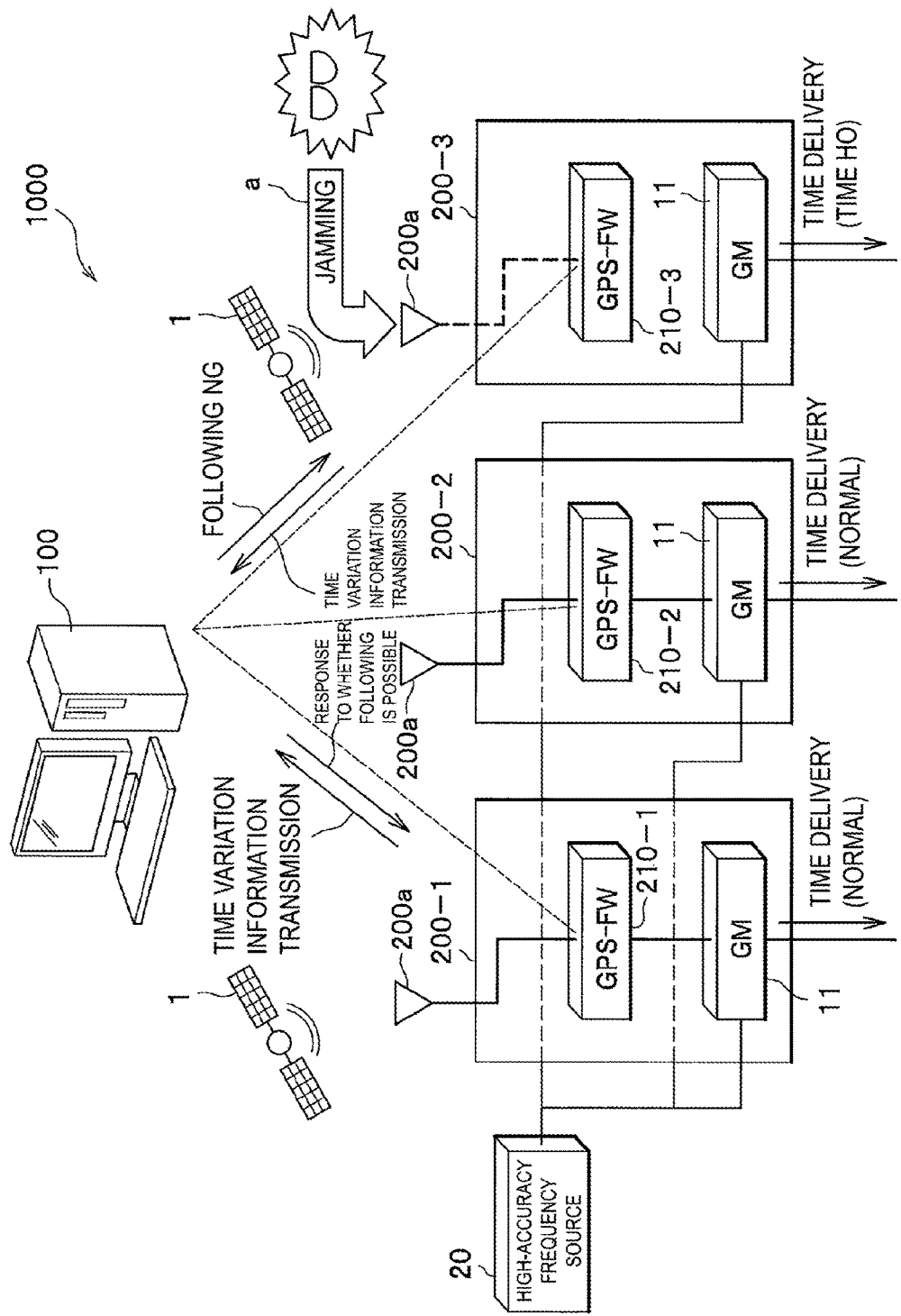
FIG. 1 is a diagram illustrating a time synchronization system including a management apparatus according to an embodiment of the present disclosure.
Figure 8:
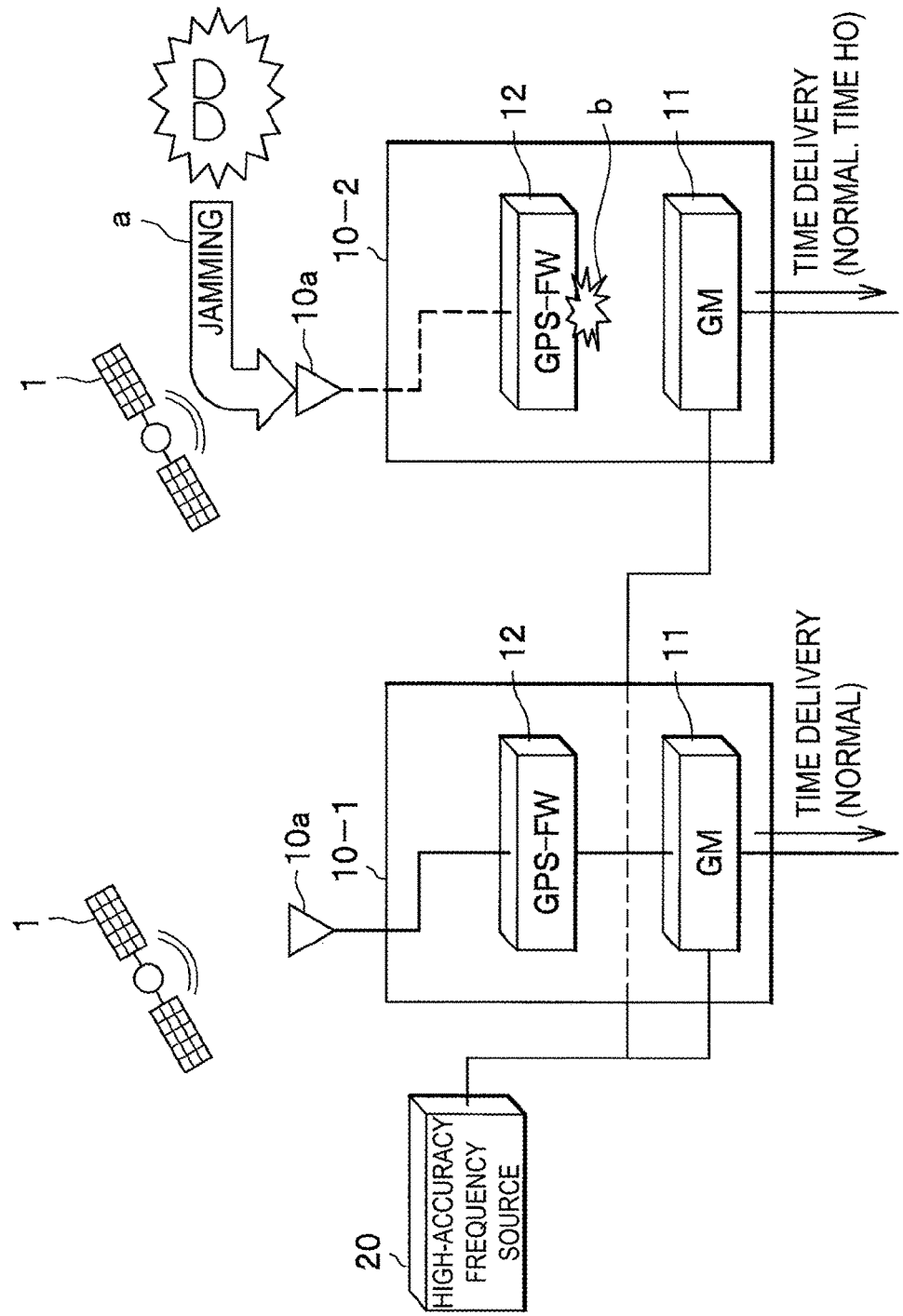
FIG. 8 is a diagram illustrating a time synchronization apparatus in which a GPS-FW is provided for security measures in the related art.
Figure 9:
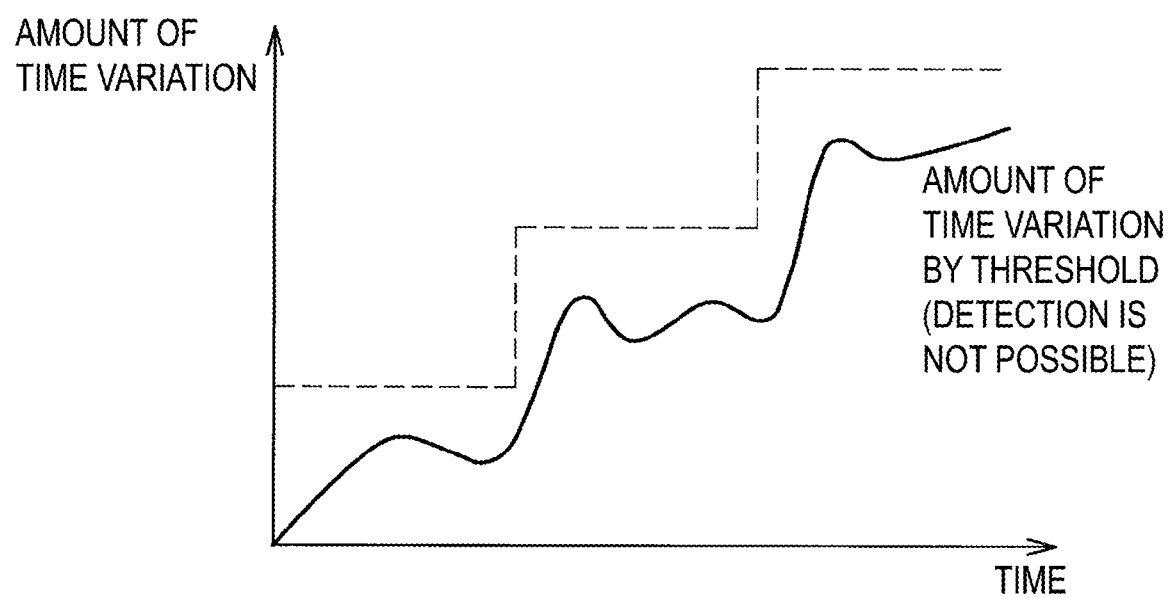
FIG. 9 is a diagram illustrating a detection algorithm of the GPS-FW in the related art.

FIG. 1 is a diagram illustrating a time synchronization system including a management apparatus according to an embodiment of the present disclosure. The similar components as those in FIG. 8 are denoted by the similar reference signs.

As illustrated in FIG. 1, a time synchronization system 1000 includes a management apparatus 100 and time synchronization apparatuses 200-1 to 200-3. The management apparatus 100 is connected to the time synchronization apparatuses 200-1 to 200-3 by a wireless or wired communication unit (see a broken line in FIG. 1) to enable communication. The communication unit may be any type.

The time synchronization apparatuses 200-1 to 200-3 receive radio waves from a GPS satellite 1 (positioning satellite), and take time synchronization using time information included in the received radio waves as a time source, to deliver a time.

The time synchronization apparatuses 200-1 to 200-3 include GPS antennae 200a, GPS-FWs 210-1 to 210-3, and GMs 11. A high-accuracy frequency source 20 that oscillates a high-accuracy frequency is connected to the GM 11. The high-accuracy frequency source 20 supplies the high-accuracy frequency when the time synchronization apparatus 200 is in a time Holdover state. The time synchronization apparatuses 200-1 to 200-3 may be collectively described as a time synchronization apparatus 200. The GPS-FWs 210-1 to 210-3 are referred to as a GPS-FW 210 so long as the particular distinguishment is not needed.

The GPS-FW 210 transmits time variation information and position information of the GPS-FW 210 to the management apparatus 100, and receives a response to whether to follow time synchronization, from the management apparatus 100. In a case where the GPS-FW 210 receives following NG of the time synchronization, the GPS-FW 210 blocks time information from a GPS signal. In response to blocking of the time information, the GPS-FW 210 transits to the time Holdover state. The GPS-FW 210 takes time synchronization using the high-accuracy frequency of the high-accuracy frequency source 20 as a reference time source, and performs time delivery.

In the present embodiment, the time synchronization system 1000 includes the high-accuracy frequency source 20. The time synchronization apparatuses 200-1 to 200-3 transition to the time Holdover state in response to blocking of the time information, and takes time synchronization using a high-accuracy frequency of the high-accuracy frequency source 20 as a reference time source, to perform time delivery.

The GPS-FW 210 may be a form in which a detection algorithm of a threshold determination type similar to that of the GPS-FW 12 in FIG. 8 is also used.

Figure 2:
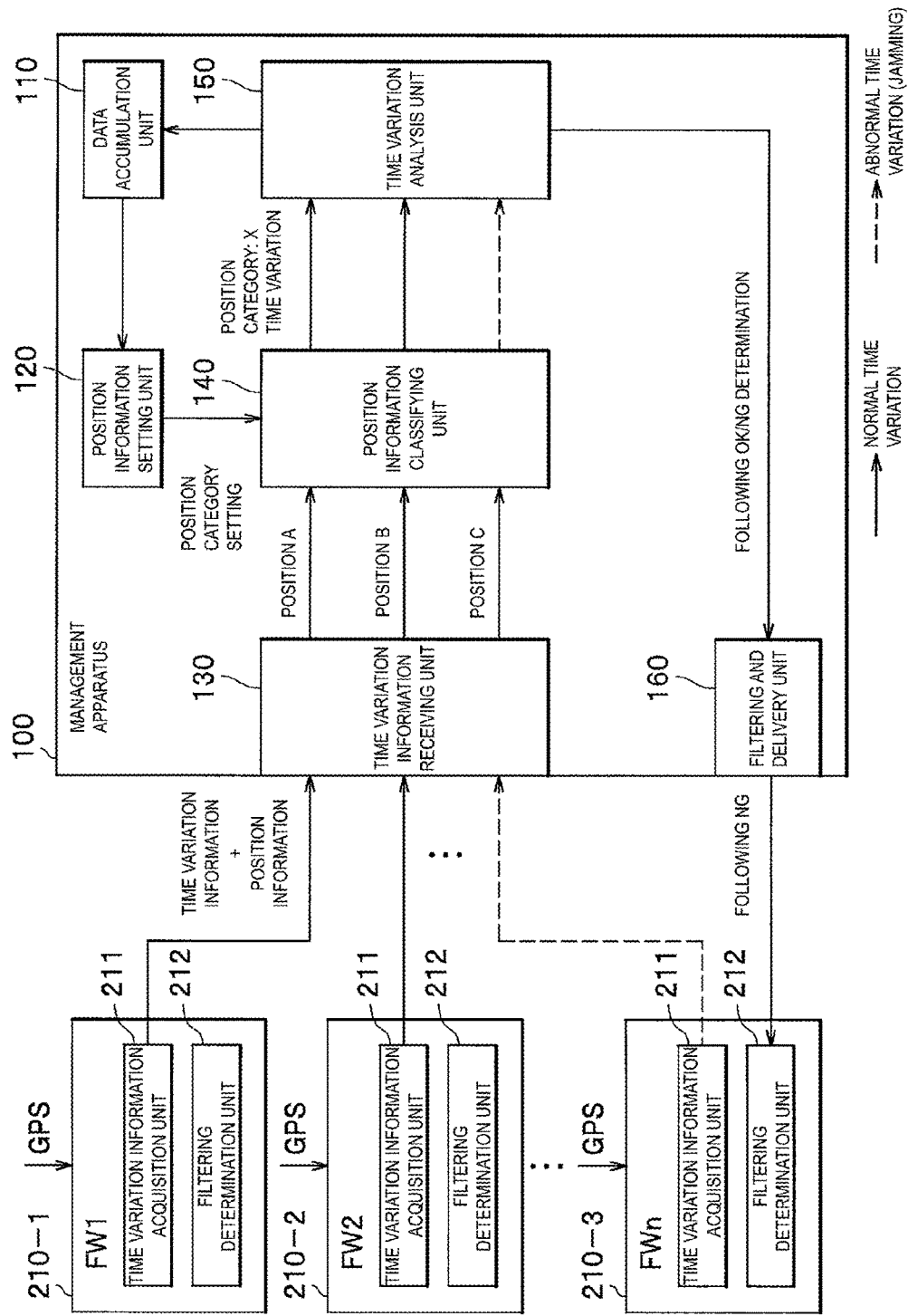
FIG. 2 is a block diagram illustrating functions of the management apparatus and a GPS-FW in the time synchronization system according to the embodiment.

FIG. 2 is a block diagram illustrating functions of the management apparatus 100 and the GPS-FW 210 in the time synchronization system.

As illustrated in FIG. 2, the GPS-FWs 210-1 to 210-3 include time variation information acquisition units 211 and filtering determination units 212 (filtering unit).

The time variation information acquisition unit 211 acquires time variation information from the received GPS signal, and transmits the acquired time variation information and position information of the GPS-FW 210 to the management apparatus 100.

The filtering determination unit 212 blocks the time information received from a GPS satellite 1 in a case where GPS-FW 210 receives the block instruction from the management apparatus 100.

The filtering determination unit 212 receives a response to whether to follow time synchronization, from the management apparatus 100. In a case where the filtering determination unit 212 receives following NG of the time synchronization, the filtering determination unit 212 blocks the time information from the GPS signal.

The management apparatus 100 includes a data accumulation unit 110, a position information setting unit 120, a time variation information receiving unit 130, a position information classifying unit 140 (category classification unit), a time variation analysis 150 (analysis unit), and a filtering and delivery unit 160 (output unit).

The data accumulation unit 110 is a memory that accumulates the analyzed time variation information. The memory may be any storage unit.

The position information setting unit 120 sets the category of position information as a category indicating the identical time variation, based on the accumulated time variation information. In the time variation, an environmental factor (for example, weather) is the main factor. In the present embodiment, as the environmental factor, the location (position) in which the time synchronization apparatus 200 (GPS-FW 210) is provided is set as a category.

It is assumed that accumulation of time variation information by the data accumulation unit 110 and category setting by the position information setting unit 120 are already set before time synchronization processing described later is performed.

The time variation information receiving unit 130 acquires the time variation information and the position information of each of the time synchronization apparatuses 200-1 to 200-3. The position information classifying unit 140 classifies the time synchronization apparatuses 200-1 to 200-3 into predetermined categories, based on the acquired position information. The position information classifying unit 140 categorizes such that environmental factors by time variation are categorized as identical to each other.

The time variation analysis 150 determines whether patterns of time variation of the time synchronization apparatuses 200 belonging to the identical category are identical to each other, multiple times. The time variation analysis 150 analyzes the time variation based on the determined results. The time variation analysis 150 determines that a majority side is normal time variation and determines that a minority side is abnormal time variation (GPS jamming).

The filtering and delivery unit 160 outputs an instruction to block the time information received from the positioning satellite, to the time synchronization apparatus 200 having abnormal time variation. In a case where the analysis determines that the majority side is normal, the filtering and delivery unit 160 transmits following OK to the time synchronization apparatus 200 on the majority side. In a case where the analysis determines that the minority side is abnormal, the filtering and delivery unit 160 transmits following NG to the time synchronization apparatus 200 on the minority side.

In the present embodiment, a configuration example in which the GPS-FWs 210-1 to 210-3 include the time variation information acquisition units 211 and the filtering determination units 212 is described. However, the above components may be provided in the time synchronization apparatus 200.

An operation of the time synchronization system 1000 configured as described above will be described below.

Firstly, the operation of the time synchronization apparatus 200 (GPS-FW 210) will be described.

Time Synchronization Operation of GPS-FW 210

Figure 3A:
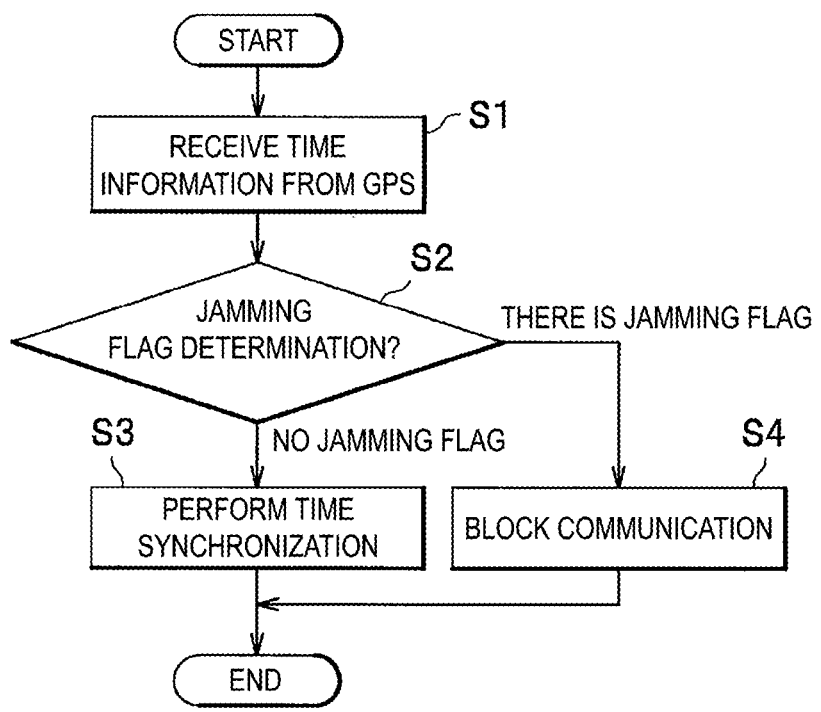
FIG. 3A is a flowchart illustrating normal time processing of a time synchronization operation of the GPS-FW in the time synchronization apparatus in the time synchronization system according to the embodiment.
Figure 3B:
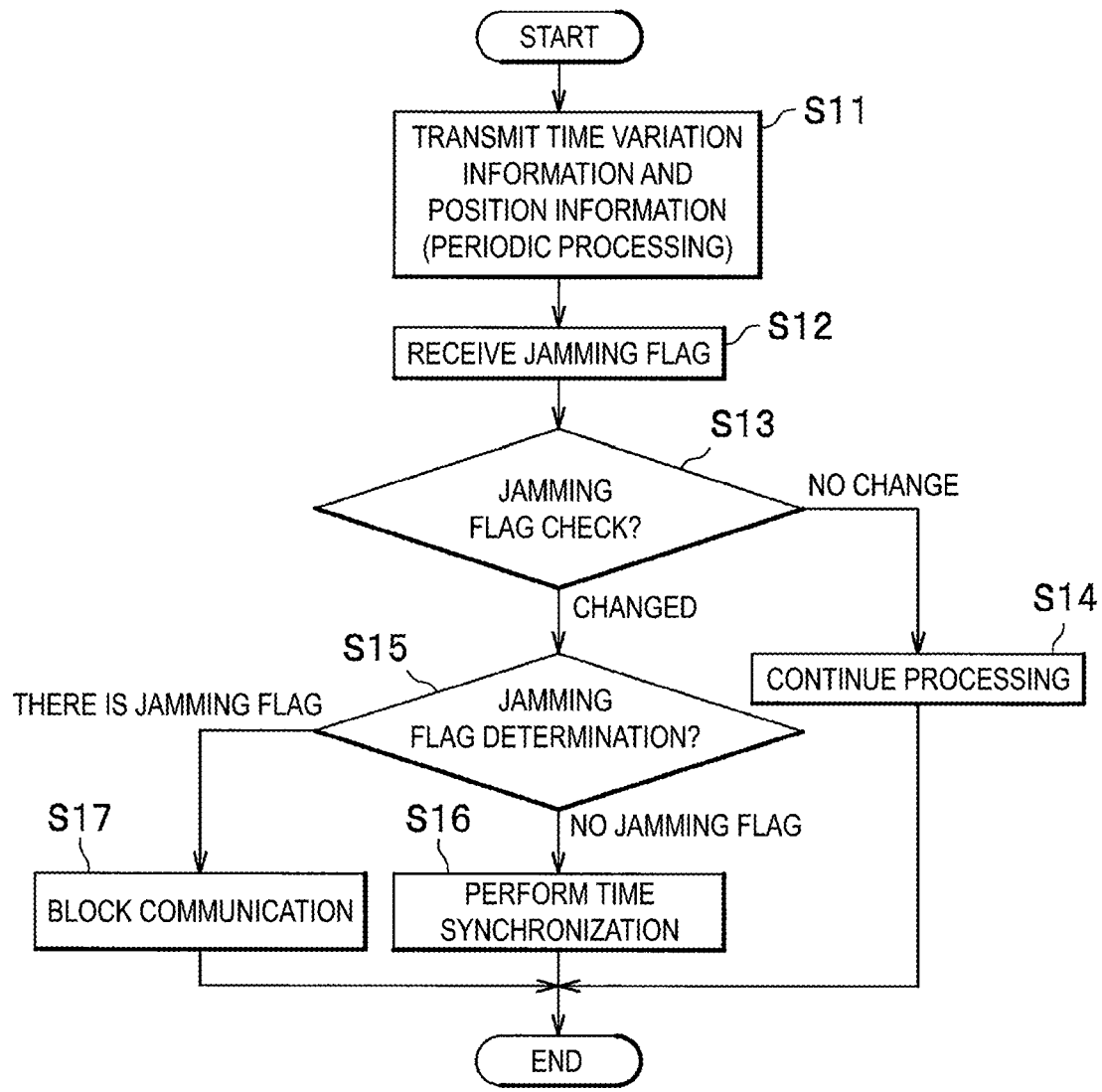
FIG. 3B is a flowchart illustrating periodic processing in communication with the management apparatus in the time synchronization operation of the GPS-FW in the time synchronization apparatus in the time synchronization system according to the embodiment.

FIGS. 3A and 3B are flowcharts illustrating a time synchronization operation of the GPS-FW 210 in the time synchronization apparatus 200. FIG. 3A is a flowchart illustrating normal time processing, and FIG. 3B is a flowchart illustrating periodic processing in communication with the management apparatus 100.

Normal Time Synchronization Operation

As illustrated in FIG. 3A, in normal time, in Step S1, the time variation information acquisition unit 211 acquires time variation information from a GPS signal received from the GPS satellite 1 (see FIG. 1).

In Step S2, the filtering determination unit 212 determines a jamming flag. That is, in a case where performing the jamming determination, the management apparatus 100 transmits following NG as a determination of whether following is possible, to the corresponding GPS-FW 210. The filtering determination unit 212 in the GPS-FW 210 to which the following NG has been transmitted sets a jamming flag.

In a case where there is no jamming flag in Step S2, in Step S3, the GM 11 (see FIG. 1) in the time synchronization apparatus 200 performs time synchronization using a highly-accurate time of the GPS satellite 1 (see FIG. 1) as a time source. Then, the GPS-FW 210 ends the processing flow. The GM 11 uses the GPS signal, and thus does not require regular time calibration.

In a case where there is a jamming flag in Step S2, in Step S4, the filtering determination unit 212 blocks the time information in the GPS signal and then ends the processing flow. In response to blocking of the time information, the GM 11 transitions to the time Holdover state. The GM 11 takes time synchronization using the high-accuracy frequency of the high-accuracy frequency source 20 as a reference time source, and performs time delivery.

Here, a timing at which the management apparatus 100 transmits a response to whether following is possible, to the time synchronization apparatus 200 is asynchronous with a timing at which the time synchronization apparatus 200 performs time synchronization based on the time information in the GPS signal. Thus, in the present embodiment, in a case where the GPS-FW receives the following NG from the management apparatus 100, the GPS-FW 210 sets the jamming flag and blocks the time information at the appropriate timing.

Periodic Processing Operation n Communication

As illustrated in FIG. 3B, in normal time, in Step S11, the time variation information acquisition unit 211 periodically transmits the time variation information acquired from the GPS signal of the GPS satellite 1 (see FIG. 1) and the position information of the PS-FW 210, to the management apparatus 100. The time variation information and the position information are received by the time variation information receiving unit 130 (see FIG. 2) in the management apparatus 100.

In Step S12, the filtering determination unit 212 receives the jamming flag given to following NG transmitted by the filtering and delivery unit 160 (see FIG. 2) in the management apparatus 100. That is, in a case where performing the jamming determination, the management apparatus 100 transmits the following NG with the jamming flag, to the corresponding GPS-FW 210.

In Step S13, the filtering determination unit 212 checks the jamming flag. In a case where the jamming flag is not changed, in Step S14, the filtering determination unit 212 continues the processing and ends the flow.

In a case where the jamming flag is changed, in Step S15, the filtering determination unit 212 determines the jamming to occur. In a case where there is no jamming flag, the jamming flag is stored in the memory. In Step S16, the GM 11 (see FIG. 1) in the time synchronization apparatus 200 performs time synchronization using a highly-accurate time of the GPS satellite 1 (see FIG. 1) as a time source. Then, the GPS-FW 210 ends the processing flow.

In a case where there is a jamming flag in Step S15, in Step S17, the filtering determination unit 212 blocks the time information in the GPS signal and then ends the processing flow. In response to blocking of the time information, the GM 11 transitions to the time Holdover state. The GM 11 takes time synchronization using the high-accuracy frequency of the high-accuracy frequency source 20 as a reference time source, and performs time delivery.

Operation of Management Apparatus 100

Next, an operation of the management apparatus 100 will be described.

Figure 4:
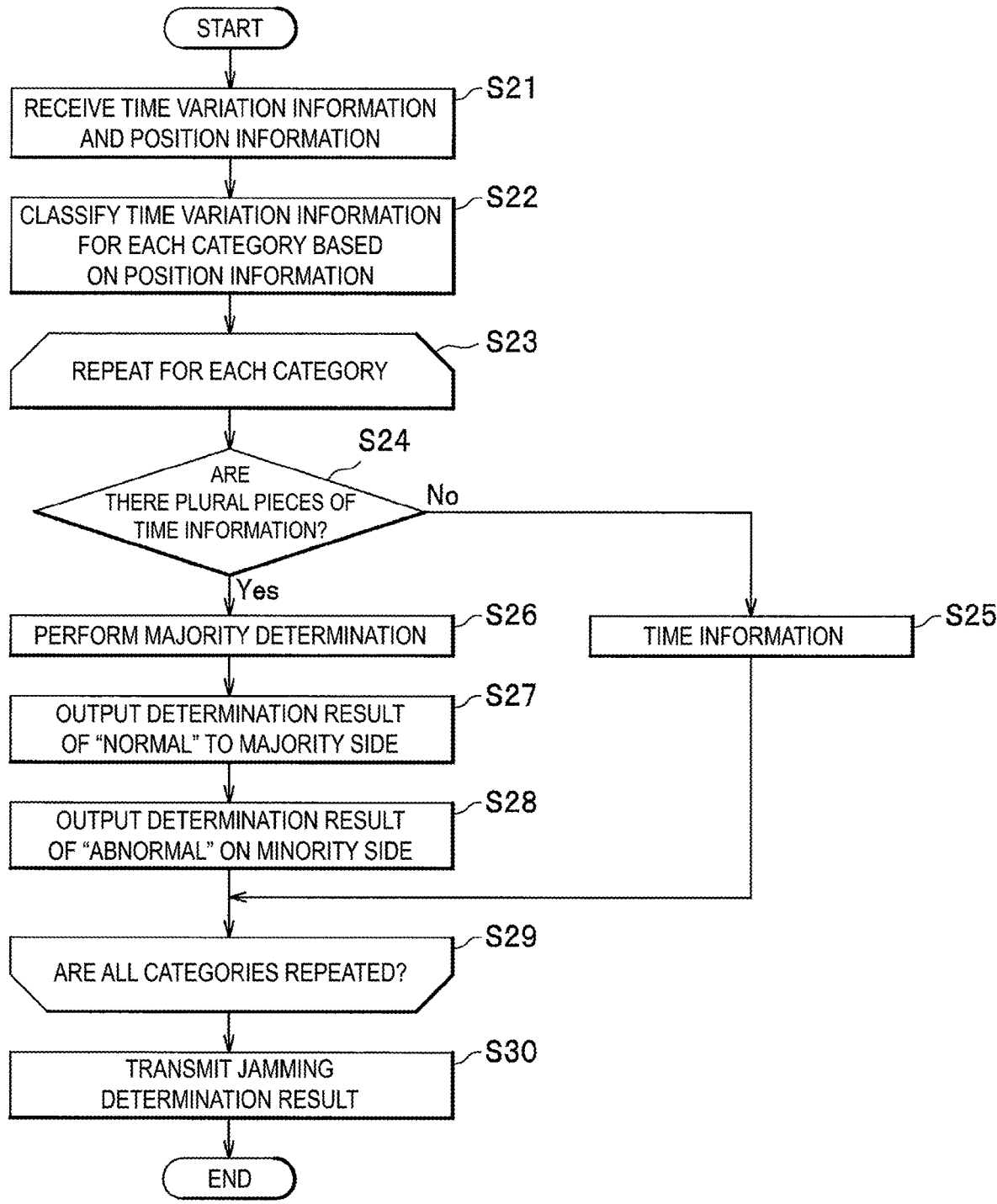
FIG. 4 is a flowchart illustrating an operation of the management apparatus in the time synchronization system according to the embodiment.

FIG. 4 is a flowchart illustrating an operation of the management apparatus 100 in the time synchronization system 1000.

In Step S21, the time variation information receiving unit 130 receives time variation information and position information from each of the GPS-FWs 210-1 to 210-3. The GPS-FWs 210-1 to 210-3 transmit the time variation information and the position information periodically (for example, every 10 minutes). The time variation information receiving unit 130 receives the time variation information and the position information from the GPS-FWs 210-1 to 210-3.

In Step S22, the position information classifying unit 140 classifies pieces of time variation information from the GPS-FWs 210-1 to 210-3 for each category, based on the received position information of each of the GPS-FWs 210-1 to 210-3. The position information setting unit 120 sets a category used for classification, in advance. In the present embodiment, regarding the category, "positions (regions) A, B, . . . , and X" in which the GPS-FWs 210-1 to 210-3 are provided are used for the classification. The "positions (regions) A, B, . . . , and X" corresponds to, for example, "a published area of the weather warning and care broadcast or weather forecast" of the Meteorological Administration. In this case, a primary subdivision unit in which each prefecture having similar weather characteristics is divided into several, or a local forecast zone wider than that is used. That is, the position information classifying unit 140 categorizes such that the time variation is similar.

It is assumed that the GPS-FW 210 belonging to the same category is in an environment of the similar weather characteristics (weather condition). If the pieces of time variation information from the GPS-FWs 210-1 to 210-3 are classified into the same category ("positions (regions) A, B, . . . , and X"), the radio reception statuses of the GPS-FWs 210 in the category are substantially identical to each other. Thus, it is possible to eliminate or minimize a threshold set for variation by the weather factor.

The management apparatus 100 repeats the following processing for each category, between the loop start of Step S23 and the loop end of Step S29.

In Step S24, the position information classifying unit 140 determines whether plural pieces of time variation information are stored in the same category. As an example in a case where plural pieces of time variation information are stored in the same category, there is a case where a plurality of GPS-FWs 210 (for example, GPS-FW 210-1 and GPS-FW 210-2) are provided at the identical position (region) A. In this case, pieces of the time variation information of the GPS-FW 210-1 and GPS-FW 210-2 at the identical position (region) A are stored in a memory (not illustrated).

In a case where the plural pieces of time variation information are not stored (Step S24: No), it is determined that a condition for performing majority determination is not satisfied, and the process proceeds to Step S29.

In a case where the plural pieces of time variation information are stored (Step S24: Yes), in Step S26, the time variation analysis 150 performs majority determination on the pattern of time variation in the GPS-FW 210, based on the pieces of time variation information of a plurality of GPS-FWs 210 belonging to the same category. The variation by the weather factor is eliminated from the pieces of time variation information of the plurality of GPS-FWs 210 belonging to the same category. Thus, the time variation of the GPS-FW 210 shows the same pattern. For example, the amount of variation in pieces of the time variation information of the plurality of GPS-FWs 210 during a periodical period (every 10 minutes) is obtained. The GPS-FWs having the amounts of variation, which are equal to each other in a predetermined range are set to the majority side. The GPS- FWs in which the amount of variation is not equal are set to the minority side. The majority determination is performed, and, if the determination result indicates the majority side, determination as normal is possible.

Here, a mechanism of the majority determination will be described.

In cases where external factors such as weather are the identical, and there is no influence of jamming or the like, it is considered that errors between GPS antennae are two being (1) individual differences (receiver noise) in the antenna and (2) a multipath effect. It is difficult to handle (1) above, and 7 ns (standardized contribution proposal) being the maximum value is employed. Because it is possible to handle (2) above by basically devising the location in which the antenna is provided, 4 ns (standardized contribution proposal) being the minimum value is employed. The apparatuses having the same value in a range of 11 ns are considered to be the majority side, and the apparatuses which do not have the same value are considered to be the minority side. Determination may be performed to be considered to be in a predetermined range (setting a range of about 10 ns in consideration of a GPS receiver error).

In a case where the majority is the equal number, determination as normal is not performed in the comparison. The majority determination is performed again at the next collection timing (for example, a period of 10 minutes).

Returning to the flow in FIG. 4, in Step S27, the time variation analysis 150 outputs a determination result indicating that the majority side is set to be "normal", to the filtering and delivery unit 160.

In Step S28, the time variation analysis 150 outputs a determination result indicating that the minority side is set to be "abnormal", to the filtering and delivery unit 160.

In Step S29, the management apparatus 100 determines whether all categories have been repeated. In a case where all of the categories have not been repeated, the process returns to Step S23 to repeat the above processing.

In a case where all of the categories have been repeated in Step S29, in Step S30, the filtering and delivery unit 160 transmits a jamming determination result to the corresponding GPS-FW 210, and then ends the processing flow. Specifically, the filtering and delivery unit 160 transmits the following OK to the GPS-FW 210 of the jamming determination result (normal) and transmits the following NG to the GPS-FW 210 of the jamming determination result (abnormal). Thus, in a case where jamming does not occur, the filtering and delivery unit 160 transmits the following OK (jamming determination result (normal)) to all the GPS-FWs 210.

GPS Accuracy Error

Next, a relationship between the time synchronization systems 1000 and a GPS accuracy error in the present embodiment will be described.

Figure 5:
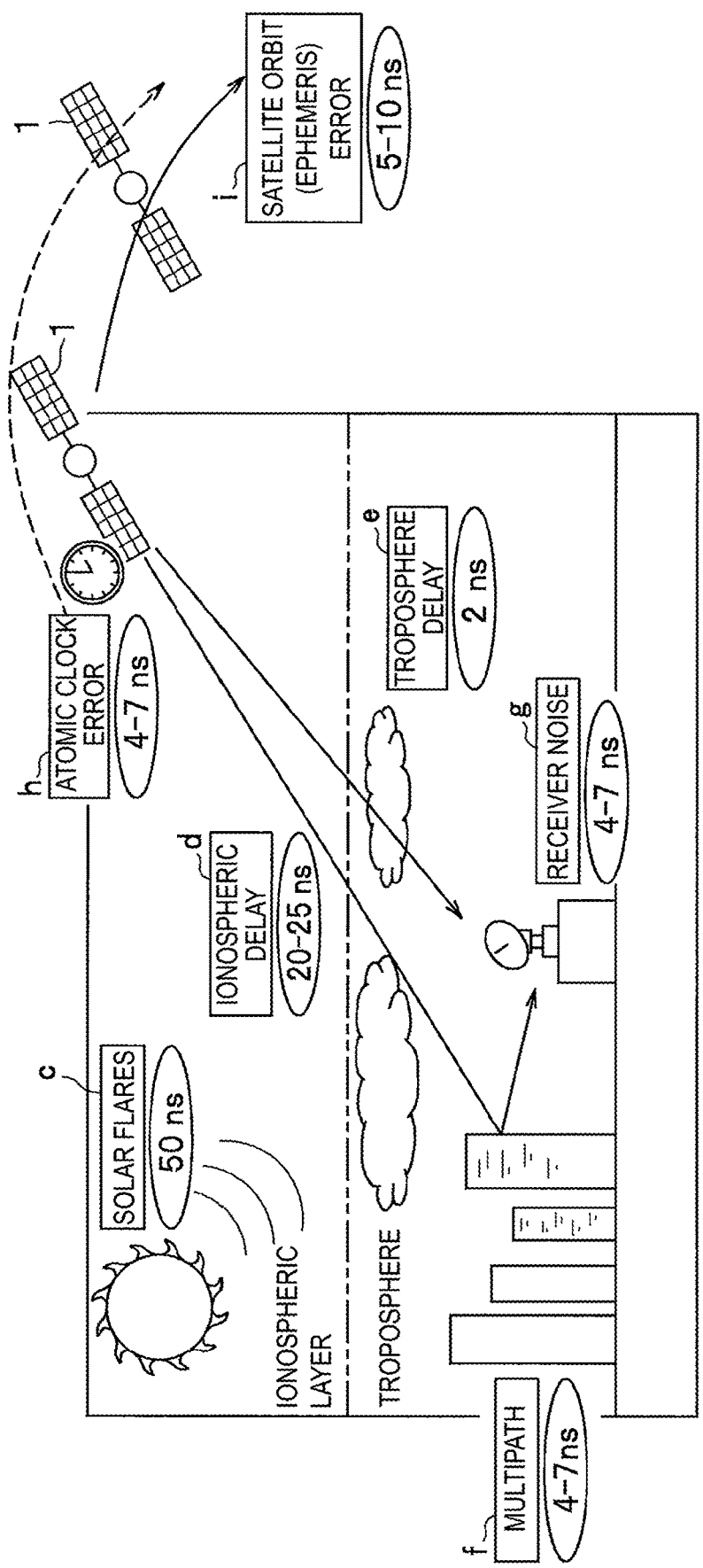
FIG. 5 is a diagram illustrating a GPS accuracy error.

FIG. 5 is a diagram illustrating a GPS accuracy error.

The GPS error factor is as follows. A time error of several tens of ns occurs by factors such as the environment.

As indicated by the reference sign c in FIG. 5, there is variation due to solar flares. Variations vary depending on the magnitude of solar activity. Non-Patent Literature 3 reports that variations by solar flares are up to 50 ns on September 2017.

As indicated by the reference sign d in FIG. 5, in the ionospheric layer, a time error of 20 to 25 ns occurs by the ionospheric delay.

As indicated by the reference sign e in FIG. 5, in the troposphere, a time error of about 2 ns occurs by the troposphere delay.

The following is possible, separate from the time error due to environmental factors such as the weather.

As indicated by the reference sign f in FIG. 5, a radio wave may be reflected by a ground structure, resulting in a multipath. Thus, a time error of 4 to 7 ns may occur.

As indicated by the reference sign g in FIG. 5, a time error of 4 to 7 ns occurs by the receiver noise of a receiver that receives the GPS signal.

Furthermore, there is a time error in the GPS system.

As indicated by the reference sign h in FIG. 5, the GPS satellite 1 has an atomic clock error of 4 to 7 ns.

As indicated by the reference sign i in FIG. 5, an error occurs by a difference in the satellite orbit (ephemeris) orbiting the GPS satellite 1, and a time error of 5 to 10 ns occurs.

As described above, in the present embodiment, the position information setting unit 120 (see FIG. 2) sets the category of position information as the category indicating the identical time variation. As the category of position information, there is an environmental factor such as weather. In addition to weather such as rain and sunny weather, the ionospheric delay indicated by the reference sign d in FIG. 5, or the troposphere delay indicated by the reference sign e in FIG. 5 are also included in the position information.

Quantitative Comparison Between Present Embodiment and Related Art

Figure 6A:
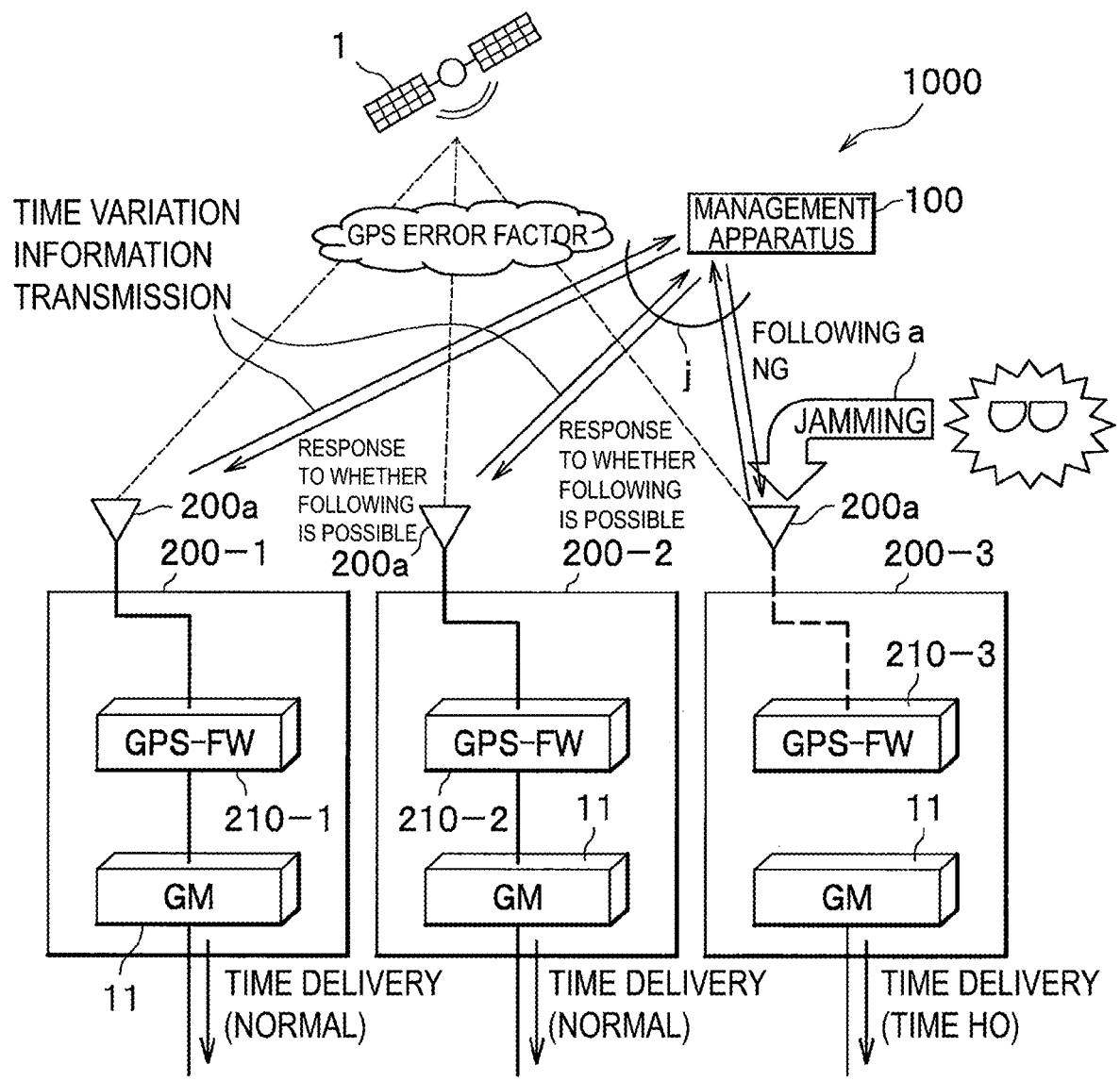
FIG. 6A is a schematic diagram illustrating a quantitative comparison of the error factor according to the present embodiment.
Figure 6B:
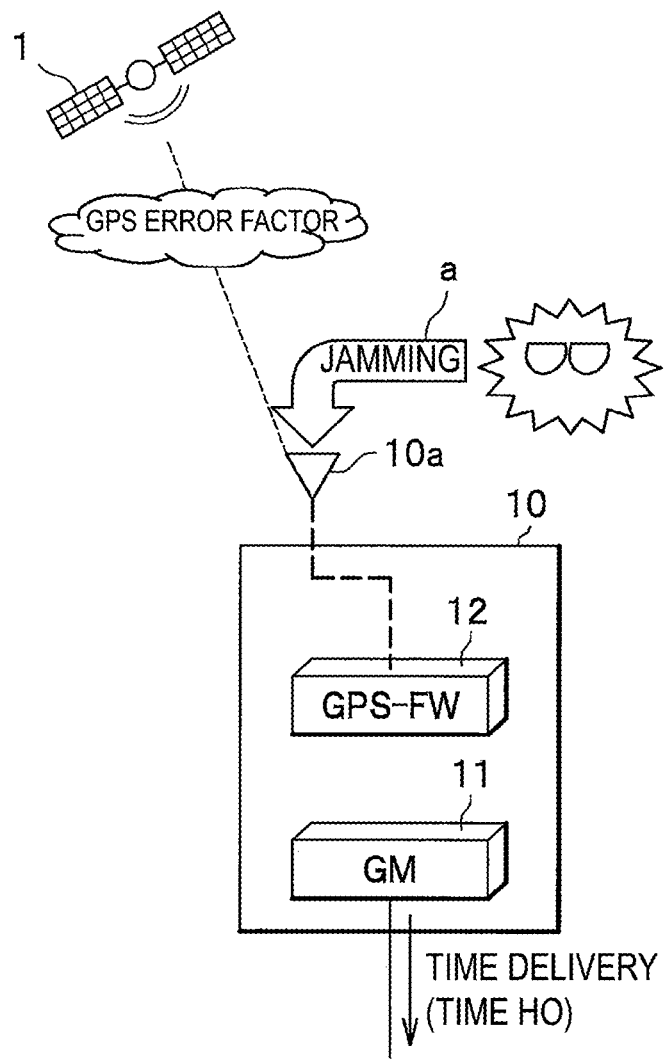
FIG. 6B is a schematic diagram illustrating a quantitative comparison of the error factor in the related art.
Figure 7A:
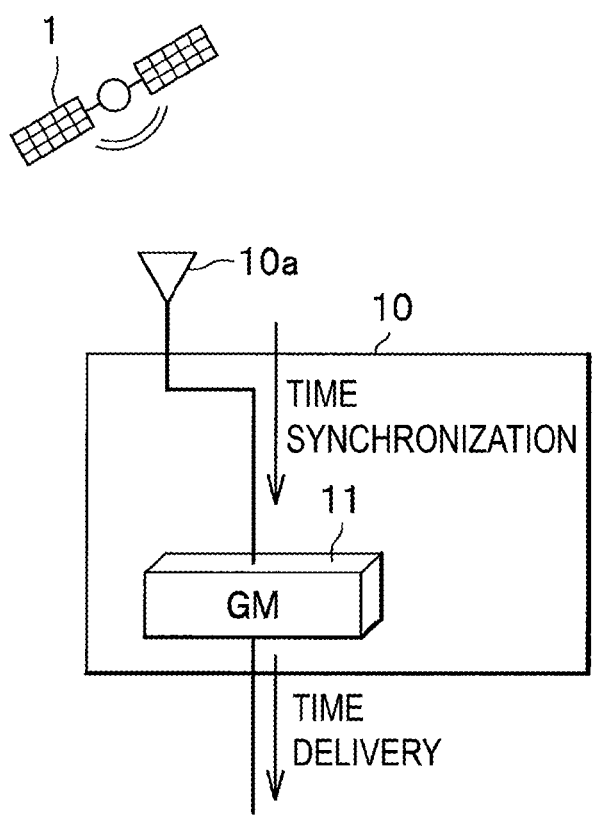
FIG. 7A is a schematic diagram illustrating a security risk in a case where jamming does not occur in a time synchronization method using a signal from a GPS satellite in the related art.
Figure 7B:
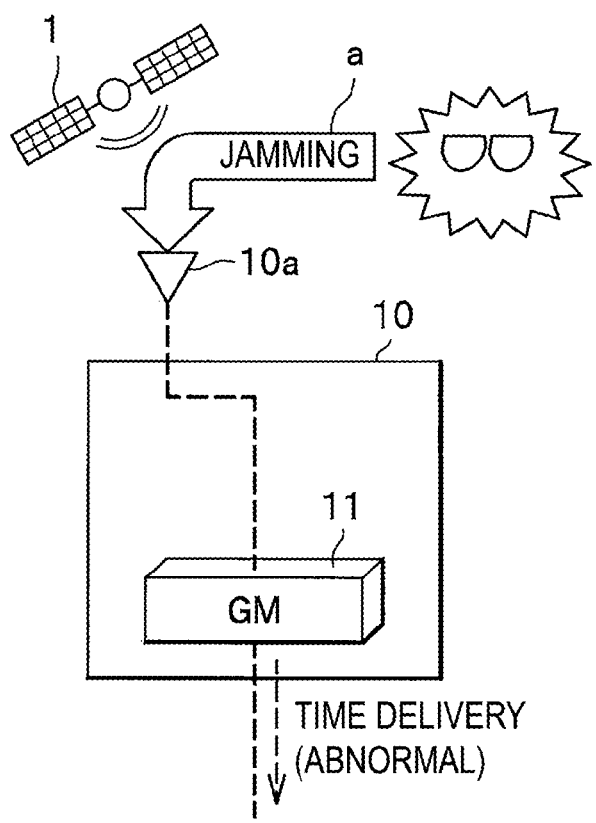
FIG. 7B is a schematic diagram illustrating a security risk in a case where there is a jamming attack in the time synchronization method using the signal from the GPS satellite in the related art.

FIGS. 6A and 6B are diagrams illustrating a quantitative comparison of the error factor between the present embodiment and the related art. FIG. 6A is a schematic diagram illustrating the time synchronization system 1000 in the present embodiment, and FIG. 6B is a schematic diagram illustrating the related art. The similar components as those in FIG. 1 and FIG. 8 are denoted by the similar reference signs.

As illustrated in FIG. 6B, a time synchronization apparatus 10 includes a GPS-FW 12 as measures for jamming. As described with reference to FIG. 5, the GPS has a time error by factors such as the environment. Thus, the GPS-FW 12 in the related art needs to tolerate a small time error (within a few tens of ns) and provides a threshold for the tolerance (see FIG. 8). As described above, because it is not possible to detect the variation within the threshold, it is not possible that the GPS-FW 12 handles jamming which continues for a long term within a threshold range.

On the other hand, in the present embodiment, each of the GPS-FWs 210-1 to 210-3 periodically transmits the time variation information and the position information to the management apparatus 100 (see the reference sign j in FIG. 6A). The management apparatus 100 performs the category classification and majority determination illustrated in the flow in FIG. 4. In a case of the jamming determination result (normal), the management apparatus 100 transmits a response to whether following is possible to the GPS-FWs 210-1 to 210-3. In a case of the jamming determination result (abnormal), the management apparatus 100 transmits following NG to the GPS-FW 210 that has been jammed. Thus, the GPS-FW 210 can transition to the time Holdover state in response to blocking of the time information, without setting threshold as in the related art.

As described above, the time synchronization system 1000 includes the management apparatus 100. The management apparatus 100 includes the time variation information receiving unit 130 configured to acquire the time variation information and position information of the time synchronization apparatuses 200-1 to 200-3, the position information classifying unit 140 configured to classify the time synchronization apparatuses into predetermined categories based on the acquired position information, a time variation analysis 150 configured to determine majority based on whether patterns of time variation of the time synchronization apparatuses 200 belonging to an identical category are identical to each other, and to analyze the time variation based on the determined results, and a filtering and delivery unit 160 configured to output an instruction to block the time information received from the positioning satellite, to the time synchronization apparatus having abnormal time variation.

The GPS-FW 210 in the time synchronization apparatus 200 includes the time variation information acquisition unit 211 configured to acquire the time variation information from the received GPS signal, and to transmit the acquired time variation information and the position information of the GPS-FW 210 to the management apparatus 100, and the filtering determination unit 212 configured to block the time information received from the GPS satellite 1 in a case where a block instruction is received from the management apparatus 100.

With the configuration, the time variation information in the identical environment, that is, the time variation information in which the category of position information is the same is aggregated, and the time variation is analyzed (for example, majority determination). Thus, the time variation having an abnormal pattern (GPS jamming) is determined. In this case, due to the time variation of the identical environment, it is possible to eliminate errors by the environmental factors. Setting threshold for tolerating the small time error (within tens of ns) is not required. As described above, because it is possible to detect the GPS jamming without using the filter for the time variation by the threshold, it is possible to filter the GPS jamming causing the minute disturbance to continue (jamming continuing for a long term within the threshold value range). Because the threshold is not used, it is possible to improve the detection accuracy of the jamming up to a range within a few ns of the receiver error (see the reference sign g in FIG. 5).

The position information classifying unit 140 categorizes such that the environmental factors of the time synchronization apparatuses 200-1 to 200-3 are categorized as identical to each other. Thus, the time variation of the identical environment is uniform, and thus it is possible to eliminate an error caused by an environmental factor.

In addition, the time variation analysis 150 determines that a majority side is normal time variation and determines that a minority side is abnormal time variation. In a case where the analysis determines that the majority side is normal, the filtering and delivery unit 160 transmits following OK to the time synchronization apparatus 200 on the majority side. In a case where the analysis determines that the minority side is abnormal, the filtering and delivery unit 160 transmits following NG to the time synchronization apparatus 200 on the minority side. Thus, the filtering determination unit 212 in the time synchronization apparatus 200 on the minority side blocks the time information of the GPS signal. In response to blocking of the time information, the GM 11 transitions to the time Holdover state. The GM 11 takes time synchronization using the high-accuracy frequency of the high-accuracy frequency source 20 as a reference time source, and performs time delivery. The time synchronization apparatuses 200 on the majority side can continuously perform highly-accurate time synchronization of the GPS satellite 1 by using a highly-accurate time of the GPS satellite 1 as the time source.

The time synchronization system 1000 includes the high-accuracy frequency source 20. The time synchronization apparatuses 200-1 to 200-3 transition to the time Holdover state in response to blocking of the time information, and takes time synchronization using a high-accuracy frequency of the high-accuracy frequency source 20 as a reference time source, to perform time delivery. Thus, the GPS-FW 210 can filter the GPS jamming without setting the threshold as in the related art. It is possible to transition to a time Holdover state in response to blocking of the time information.

In a case where it is determined the majority side is normal, or the normal determination continues for a predetermined time or more, the management apparatus 100 may control the time synchronization apparatus 200 on the majority side to increase the acquisition timing of the time variation information and the position information. In this manner, it is possible to reduce the resources of the time synchronization system 1000.

Hitherto, the embodiment of the present disclosure has been described. However, the present disclosure is not limited to the above embodiment, and can be appropriately changed in a range without departing from the gist of the present disclosure.

For example, a configuration example in which, in the time synchronization apparatus 200, the time variation information acquisition unit 211 and the filtering determination unit 212 are provided in the GPS-FWs 210-1 to 210-3 has been described. However, the time variation information acquisition unit 211 and the filtering determination unit 212 may be provided outside the GPS-FW 210.

In addition, among the pieces of processing described in the embodiment, all or some pieces of processing described as being performed automatically can be manually performed, or all or some pieces of the processing described as being performed manually can be performed automatically by the well-known method. In addition, information including the processing procedures, the control procedures, the specific names, and the various types of data, and various parameters described in the aforementioned document and drawings can be modified as desired except in the case of the special description.

Each component of each apparatus illustrated is a functional concept, and does not necessarily need to be physically configured as illustrated. That is, the specific form of dispersion and integration of the apparatus is not limited to the illustrated form, and the entirety or a portion of the form can be configured by being functionally or physically dispersed and integrated in any unit, depending on various loads, usage conditions, and the like.

Some or all of the configurations, the functions, the processing units, the processing mechanisms, and the like may be realized in hardware by being designed, for example, in an integrated circuit. Each of the configurations, the functions, and the like may be realized in software for a processor to interpret and execute a program that implements the functions. Information such as programs, tables, files, and the like, which are for implementing the functions can be held in a recording device such as a memory, a hard disk, and a Solid State Drive (SSD), or a recording medium such as an Integrated Circuit (IC) card, a Secure Digital (SD) card, and an optical disk. In the present specification, the processing steps describing the time sequential processes include parallel or individually performed processes (for example, parallel processing or object processing) without necessarily being processed in time series, in addition to processing performed in time series in described order.

REFERENCE SIGNS LIST

11 GM
20 High-accuracy frequency source
100 Management apparatus
110 Data accumulation unit
120 Position information setting unit
130 Time variation information receiving unit
140 Position information classifying unit (category classification unit)
150 Time variation analysis (analysis unit)
160 Filtering and delivery unit (output unit)
200, 200-1 to 200-3 Time synchronization apparatus
200a GPS Antenna
211 Time variation information acquisition unit
212 Filtering determination unit (filtering unit)
1000 Time synchronization system

The invention claimed is:

1. A time synchronization system comprising:
a plurality of time synchronization apparatuses, each of the plurality of time synchronization apparatuses configured to receive a radio wave from a positioning satellite and to take time synchronization using time information included in the received radio wave as a time source to deliver a time; and
a management apparatus including one or more processors configured to:
acquire time variation information and position information of each of the time synchronization apparatuses;
classify the time synchronization apparatuses into predetermined categories based on the acquired position information;
determine a first subset of time synchronization apparatuses of the plurality of time synchronization apparatuses based on whether patterns of the time variation information of each time synchronization apparatuses belonging to an identical category are identical to each other;
analyze the time variation information from the first subset of time synchronization apparatuses; and
an output unit configured to output an instruction to block the time variation information received from the positioning satellite to the time synchronization apparatus having abnormal time variation,
wherein each time synchronization apparatus of the plurality of time synchronization apparatuses is configured to, in a case of receiving a block instruction from the management apparatus, block the time information received from the positioning satellite.

2. The time synchronization system according to claim 1, wherein the management apparatus is configured to categorize such that environmental factors having similar time variation are categorized as identical to each other.

3. The time synchronization system according to claim 1, wherein the management apparatus is further configured to:
determine that the first subset of time synchronization apparatuses is normal time variation;
determine that a second subset of time synchronization apparatuses of the plurality of time synchronization apparatuses is abnormal time variation, wherein the second subset of time synchronization is different from the first subset of time synchronization apparatuses, and
transmit, in accordance with a determination that the first subset of time synchronization apparatuses is the normal time variation, following OK to the first subset of time synchronization apparatuses; and
transmit, in accordance with a determination that the second subset of time synchronization apparatuses is the abnormal time variation, following NG to the second subset of time synchronization apparatuses.

4. The time synchronization system according to claim 1, further comprising:
a high-accuracy frequency source,
wherein in response to blocking of the time information, the time synchronization apparatus is configured to:
transition to a state where the time is not synchronized with the time information included in the radio wave from the positioning satellite; and
take time synchronization using a high-accuracy frequency of the high-accuracy frequency source as a reference time source to perform time delivery.

5. A time synchronization method in a management apparatus of a time synchronization system including a plurality of time synchronization apparatuses, each of the plurality of time synchronization apparatuses being configured to receive a radio wave from a positioning satellite and to take time synchronization using time information included in the received radio wave as a time source to deliver a time, the method comprising:
acquiring time variation information and position information of each of the time synchronization apparatuses;
classifying the time synchronization apparatuses into predetermined categories based on the acquired position information;
determining a first subset of time synchronization apparatuses of the plurality of time synchronization apparatuses based on whether patterns of the time variation information of each time synchronization apparatuses belonging to an identical category are identical to each other;
analyzing the time variation information based on the first subset of time synchronization apparatuses; and
outputting an instruction to block the time variation information received from the positioning satellite, to the time synchronization apparatus having abnormal time variation.

6. A non-transitory computer-readable medium storing software comprising instructions executable by one or more computers which, upon such execution, cause the one or more computers to perform operations comprising:
receiving, by each of a plurality of time synchronization apparatuses, a radio wave from a positioning satellite and to take time synchronization using time information included in the received radio wave as a time source to deliver a time, the operations further comprising:
acquiring time variation information and position information of each of the time synchronization apparatus;
classifying the time synchronization apparatuses into predetermined categories based on the acquired position information;
determining a first subset of time synchronization apparatuses of the plurality of time synchronization apparatuses based on whether patterns of the time variation information of each time synchronization apparatuses belonging to an identical category are identical to each other;

analyzing the time variation information based on the first subset of time synchronization apparatuses; and outputting an instruction to block the time variation information received from the positioning satellite, to the time synchronization apparatus having abnormal time variation.

\* \* \* \* \*